(12) United States Patent
Eck (10) Patent No.: US 9,873,138 B2
(45) Date of Patent: Jan. 23, 2018

(54) APPARATUS FOR PURGING AND RINSING A CHEMICAL CONTAINER

(71) Applicant: Ethan Eck, Kingman, KS (US)

(72) Inventor: Ethan Eck, Kingman, KS (US)

(*) Notice: Subject to any disclaimer, the term of this patent is extended or adjusted under 35 U.S.C. 154(b) by 277 days.

(21) Appl. No.: 14/736,587

(22) Filed: Jun. 11, 2015

(65) Prior Publication Data

US 2015/0273532 A1    Oct. 1, 2015

Related U.S. Application Data

(60) Provisional application No. 61/997,884, filed on Jun. 12, 2014.

(51) Int. Cl.
| | | |
|---|---|---|
| *B08B 3/02* | (2006.01) | |
| *B08B 9/08* | (2006.01) | |
| *B09B 3/00* | (2006.01) | |
| *B30B 1/32* | (2006.01) | |
| *B08B 9/093* | (2006.01) | |

(52) U.S. Cl.
CPC ............. *B08B 3/02* (2013.01); *B08B 9/08* (2013.01); *B09B 3/0058* (2013.01); *B30B 1/32* (2013.01); *B08B 9/093* (2013.01)

(58) Field of Classification Search
CPC .. B08B 3/02; B08B 9/08; B08B 9/093; B09B 3/58; B30B 1/32
USPC ..................................................... 134/95.1
See application file for complete search history.

(56) References Cited

U.S. PATENT DOCUMENTS

| | | | |
|---|---|---|---|
| 3,078,861 A | | 2/1963 | Miller |
| 3,993,221 A | * | 11/1976 | Boynton ............. A01M 7/0092 100/902 |
| 4,055,066 A | | 10/1977 | Lamendour |
| 4,909,141 A | | 3/1990 | Blenski et al. |
| 2014/0090749 A1 | | 4/2014 | Eck |

FOREIGN PATENT DOCUMENTS

EP    0384123    8/1990

OTHER PUBLICATIONS

U.S. Appl. No. 61/725,134, filed Nov. 12, 2012, Eck.
U.S. Appl. No. 13/928,344, filed Jul. 26, 2013, Eck.
U.S. Appl. No. 61/962,981, filed Nov. 20, 2013, Eck.
(Continued)

*Primary Examiner* — Michael Barr
*Assistant Examiner* — Tinsae Ayalew
(74) *Attorney, Agent, or Firm* — Kenneth H. Jack; Davis & Jack, L.L.C.

(57) ABSTRACT

An apparatus for purging and rinsing a container having longitudinal ends, an upper sheet, lateral walls, and a lower wall, the apparatus having a frame defining a processing space; a punch positioned to overlie the container's upper sheet; a die positioned to underlie the container; a plurality of bend resistance relieving container wall cuts positioned for segmenting the container between its longitudinal ends; a plurality of linear motion actuators connected operatively to the punch or connected operatively to the die for lessening the die's downward displacement from the punch, for bending the chemical container's upper bendable sheet about the punch, and for splaying the container's longitudinal ends; and a plurality of rinse nozzles connected operatively to the frame for spraying water into the opened container.

12 Claims, 12 Drawing Sheets

(56) References Cited

OTHER PUBLICATIONS

U.S. Appl. No. 14/542,405, filed Nov. 14, 2014, Eck.
U.S. Appl. No. 61/962,252, filed Nov. 12, 2013, Eck.
U.S. Appl. No. 61/965,796, filed Feb. 7, 2014, Eck.
U.S. Appl. No. 14/616,009, filed Feb. 6, 2014, Eck.
U.S. Appl. No. 61/997,884, filed Jun. 12, 2014, Eck.

* cited by examiner

APPARATUS FOR PURGING AND RINSING A CHEMICAL CONTAINER

FILED PROVISIONAL PATENT APPLICATION

This non-provisional patent application claims the benefit of and priority from U.S. provisional patent application No. 61/997,884 filed Jun. 12, 2014. The inventor disclosed in and applicant of said provisional application is the same as the inventor and applicant of the instant application. Substantial commonality exists between the subject matter of said provisional patent application and that of the instant application.

FIELD OF THE INVENTION

This invention relates to apparatus and assemblies which are adapted for assisting in the transfer of fluids within relatively small chemical containers into larger chemical tanks. The invention further relates to such apparatus and assemblies which are further adapted for assistance in subsequently rinsing such relatively small chemical containers.

BACKGROUND OF THE INVENTION

Agricultural herbicides and pesticides are often contained and distributed to farm operators within small two to three gallon plastic jugs or canisters. In order for such chemicals to be dispensed over crops or crop ground by farm equipment such an agricultural sprayer having a chemical tank, fluids within such small containers are typically manually poured one-by-one by the farm operator into such tank. Such manual pouring process is typically laborious and is time consuming. Following such manual one-by-one pouring of the small chemical containers, additional task steps of triple rinsing the containers must be further performed in a further laborious and time consuming manner.

The instant inventive assembly for chemical container purging and rinsing apparatus incorporates specialized frame mounted mechanisms which operate in the manner of a press brake machine for automation of the steps described above, advantageously resulting in time and labor savings.

BRIEF SUMMARY OF THE INVENTION

The workpiece upon which the instant inventive apparatus for purging and rinsing is intended to operate preferably comprises a chemical container configured as a plastic jug or plastic canister. Upon orienting such chemical container to rest upon one of its sides, such container typically comprises a lateral wall, an oppositely lateral wall, a longitudinal wall, an oppositely longitudinal wall, and a lower wall. A handle and a spout are typically being incorporated within one of such walls, typically the oppositely longitudinal wall.

The upper wall of the container workpiece (according to the above described such orientation) commonly comprises a sheet of durable plastic which is flexible and bendable, the peripheral edges of such sheet being typically formed wholly with the upper ends of the container's lateral, oppositely lateral, longitudinal, and oppositely longitudinal walls.

A first structural component of the inventive apparatus which operates upon such container workpiece comprises a frame which forms and defines an interior processing space of sufficient size for receipt of the container. In a preferred embodiment, the frame forms and defines a substantially hermetically sealable and openable space whose floor forms a fluids catch basin. Suitably, the frame may alternatively comprise an open lattice of rigid bars, such lattice frame configuration being utilizable for suspension over and for direct downward drainage of chemicals into the input port of an agricultural chemical tank.

A further structural component of the instant inventive apparatus comprises a sheet material bending and forming punch which is capable of functioning in a manner analogous with the bending function performed by a press brake machine's punch. In a preferred embodiment, the punch component presents a laterally extending and downwardly convex sheet bending face, the lateral length of the punch's face preferably being sufficient to span the lateral dimension of the upper bendable sheet portion of the chemical container workpiece. In a preferred embodiment, the punch component is positioned for, upon a receipt of the chemical container within the frame's processing space, overlying the chemical container's upper bendable sheet. Where the apparatus incorporates within its frame an upper lid, the punch component is suitably fixedly attached to and is suspended directly below the lid's undersurface.

A further structural component of the instant inventive apparatus comprises structures which are operable in the manner of a press brake machine's die in relation to the overlying punch component, the die component preferably being variably displaced downwardly with respect to the punch. In the preferred embodiment, the die component is operatively mounted within the frame and positioned directly beneath the received chemical container.

Upon vertical compressive contact of the chemical container's upper bendable sheet with the punch's downwardly convex sheet bending face, the chemical container's lateral, oppositely lateral, and lower walls tend to resist any bending or deflection of the upper bendable sheet about the punch. To lessen such resistance, bend resistance relieving means are preferably provided, such means preferably being connected operatively to the frame component. In the preferred embodiment, the bend resistance relieving means are adapted for, upon receipt of the chemical container within the processing space, partially segmenting the chemical container between its longitudinal and oppositely longitudinal ends. In a preferred embodiment, the bend resistance relieving means shears the chemical container's lateral, oppositely lateral, and lower walls at locations underlying the punch, such wall shearing freeing the entirety of the chemical container for bending and splaying motion about the punch. In preferred embodiments, the bend resistance relieving means comprise automatically operable knives or frangible channels integrally molded within the chemical container's walls. Suitable alternate bend resistance relieving means comprise rotating saw blades, reciprocating saw blades, track guided knife blades and tensioned sheet cutting wires, and pivoting knife blades.

Further structural components of the instant inventive apparatus comprise pressing means which are preferably connected operatively either to the punch component or to the die component. In the preferred embodiment, the pressing means are adapted for, while the chemical container is received and positioned between the punch and the die, lessening the die's relative downward displacement from the punch. Where the punch and die components are driven toward each other with sufficient power, the apparatus advantageously operates upon the chemical container in the manner of a press brake machine, bending the container's upper sheet about the punch. Such sheet bending action simultaneously splays the container's longitudinal and oppositely longitudinal ends and creates a central opening within the container for gravity actuated chemical purging.

In a preferred embodiment, the pressing means comprise a cylinder and piston combination linear motion actuator. Other commonly known mechanical linear motion actuators such as jack screw actuators, plunger actuators, lever arm actuators, and gear train actuators are considered to fall within the scope of the invention.

Further structural components of the instant inventive assembly comprise rinsing means which are preferably connected operatively to the frame, and are preferably adapted for spraying rinsing fluid, preferably water, into the newly opened chemical container's longitudinal and oppositely longitudinal ends. Upon operating the apparatus for chemical container pressing and opening, as described above, the apparatus's rinsing means may be operated for spraying and rinsing residual chemicals from the interior surfaces of the chemical container.

Following performance of the press braking and rinsing procedures upon the chemical container, as described above, the assembly's lid may be opened, the purged and rinsed chemical container may be removed and disposed of, and a subsequent or next successive chemical container may be placed within the processing space for similar processing. Through continuous operations and use of the instant inventive apparatus, numerous chemical containers may be quickly and conveniently purged and rinsed.

Accordingly, objects of the instant invention include the provision of an apparatus for purging and rinsing chemical containers which incorporates structures, as described above, and which arrange those structures in manners described above, for the achievement of the advantages and benefits described above.

Other and further objects, benefits, and advantages of the instant invention will become known to those skilled in the art upon review of the Detailed Description which follows, and upon review of the appended drawings.

DETAILED DESCRIPTIONS OF PREFERRED EMBODIMENTS

Figure 2:
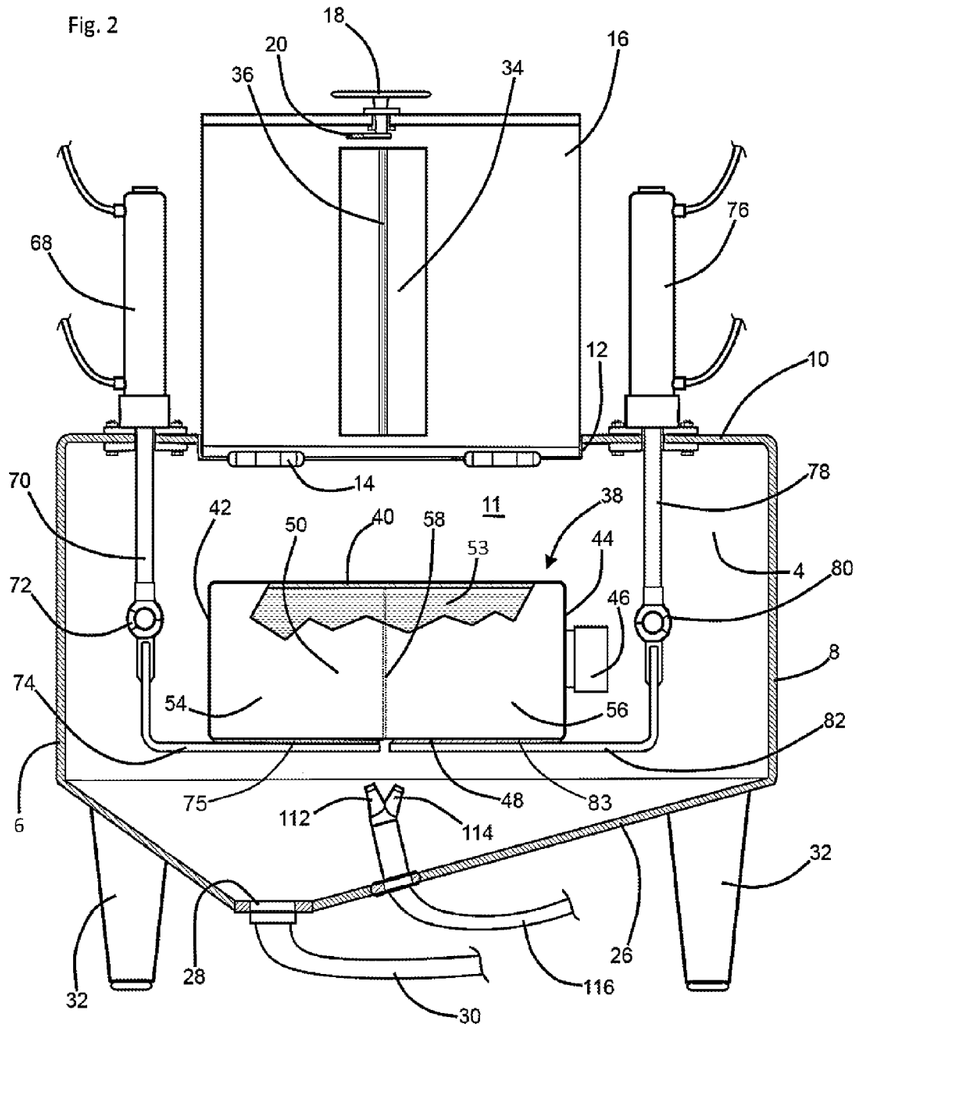
FIG. 2 is a longitudinal sectional view of the structure depicted in FIG. 1, the sectional view being in accordance with the sectional view arrows appearing upon FIG. 10, the sectional view showing an interior workpiece having a cutaway wall section.

Referring now to the drawings, and in particular to Drawing FIG. 2, a chemical container workpiece upon which the instant inventive apparatus is intended to operate is referred to generally by Reference Arrow 38. The chemical container 38 is typically plastic and has an upper wall 40 which is configured as an upper bendable sheet. The chemical container 38 further has a longitudinal (according to view) wall 42 positioned at the container's longitudinal end 54, and has an oppositely longitudinal wall 44 positioned at the container's oppositely longitudinal end 56. The container 38 has lower wall 48, a lateral wall 50, and referring to the closely analogous chemical container 38c depicted in FIGS. 9 and 10, has an oppositely lateral wall corresponding with wall 51c. A container spout and lid 46 are incorporated at the oppositely longitudinal end 56 of the container 38, and liquid chemicals 53 are preliminarily contained and stored therein.

Figure 1:
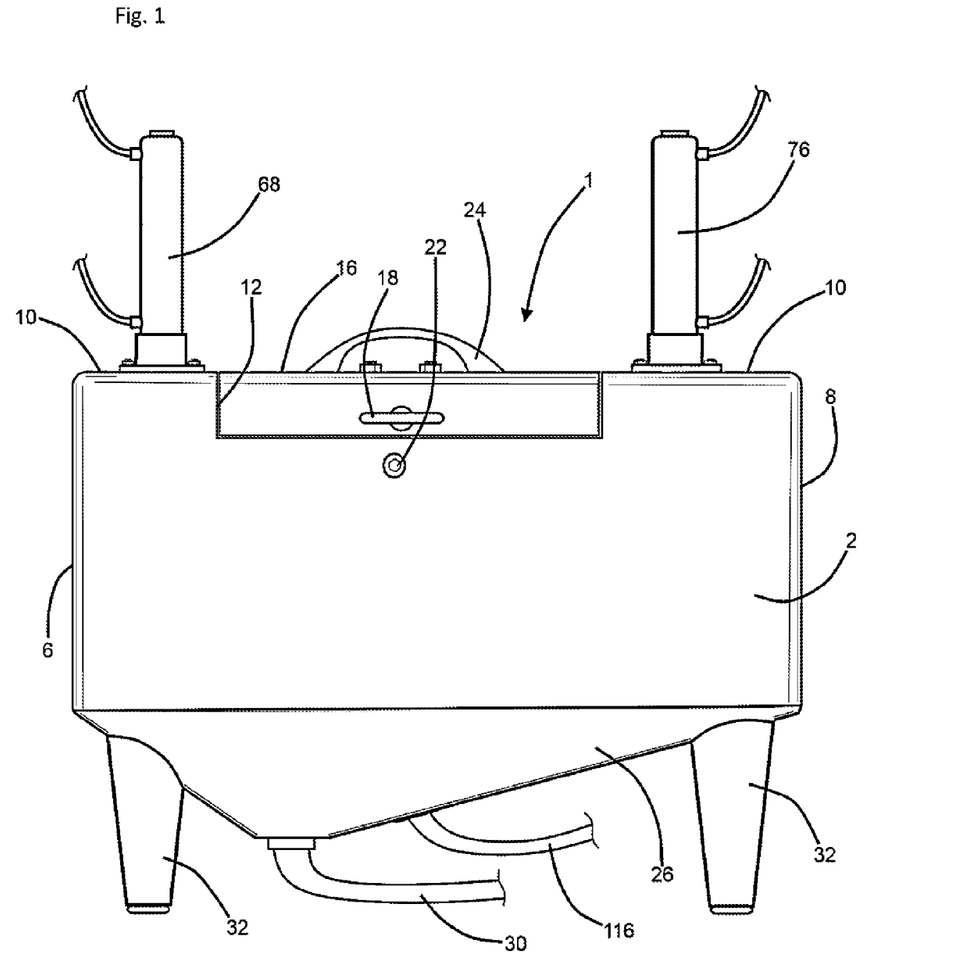
FIG. 1 is a lateral plan view of the instant inventive apparatus for purging and rinsing a chemical container.

Referring simultaneously to FIGS. 1 and 2, a preferred embodiment of the instant inventive apparatus is referred to generally by Reference Arrow 1. The apparatus 1 comprises a frame which may suitably incorporate longitudinal and oppositely longitudinal walls 6 and 8, a ceiling 10, a floor 26, a lateral wall 2 and an oppositely lateral wall 4. In the preferred embodiment, the floor 26 is configured as a fluid collecting catch basin having a low end drain port 28 which communicates with a hose 30. Pressurized output directed water flow introduced into the hose 30 from outside the apparatus 1 may advantageously carry the agricultural chemicals 53 entering the hose 30 to an agricultural implement tank such as a sprayer tank (not depicted within views).

Where the apparatus 1 is intended for use upon ground or floor surfaces, legs or support pedestals 32 are preferably fixedly attached to lower surfaces of the floor 26. In the embodiment of FIG. 2, a container receiving port 12 opens the apparatus's processing space 11 at the ceiling 10, such port being fitted for receipts of commonly sized chemical containers. A lid 16 fitted to the port 12 is preferably provided, such lid being pivotally mounted upon hinges, and being releasably latchable by means of a "T" handle 18, latch hook 20, and latch lug 22 combination. A handle 24 is preferably provided for convenient opening and closing of the lid 16.

While the apparatus frame components 2,4,6,8,10,26 are depicted as defining a substantially hermetically closed interior processing space 11, such component is intended as being representative of other commonly known frame configurations such as an open lattice of rigid bars (not depicted within views) which may similarly define an interior workpiece processing space. Where the inventive apparatus is to be operated directly over or within the upper opening of a chemical collecting tank (not depicted within views), the apparatus's frame may be suitably alternatively configured in the form of such open lattice.

Figure 3:
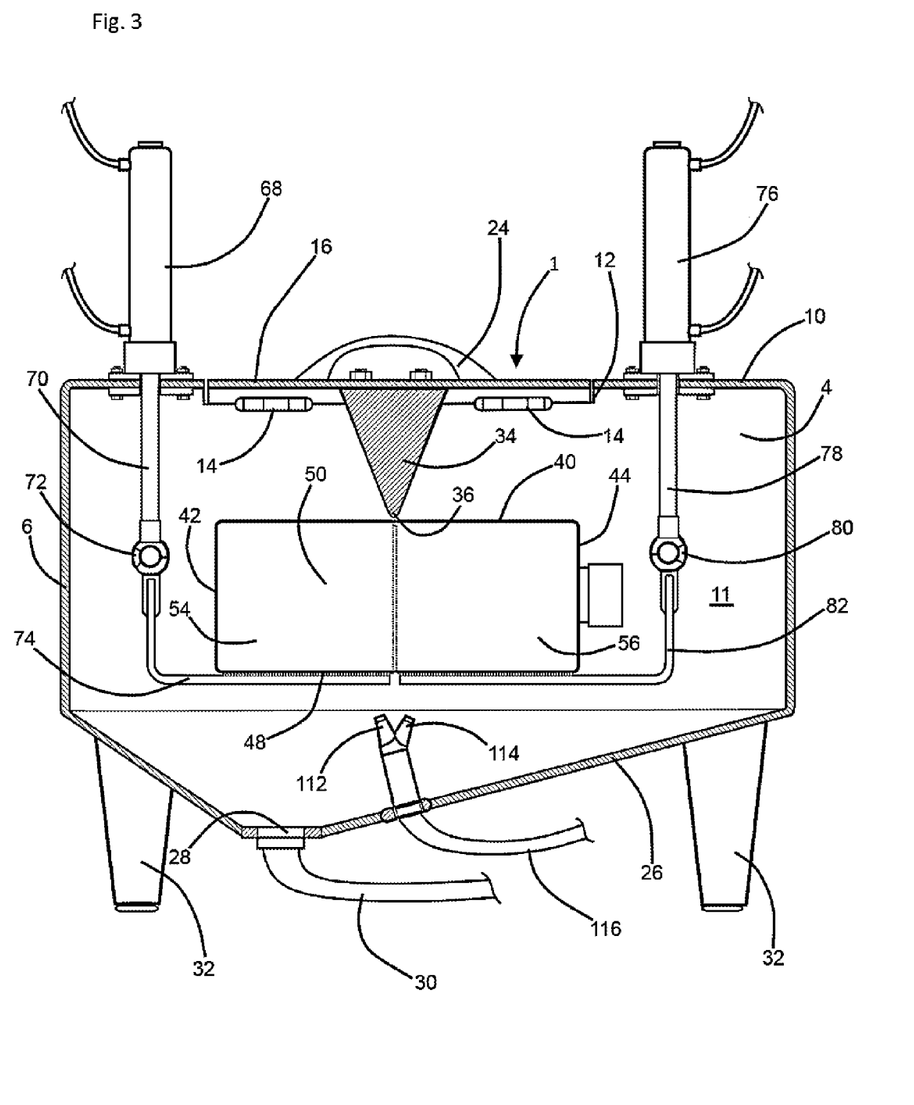
FIG. 3 redepicts the structure of FIG. 2, the view of FIG. 3 showing a closure of a lid structure, and showing resultant operative overlying deployment of a punch component.

Referring simultaneously to FIGS. 2 and 3, the instant inventive assembly preferably further comprises a punch component 34 which has a downwardly convex and laterally extending sheet bending face 36. The depicted "V" bar configuration of the punch 34 is intended as being representative of differently configured laterally elongated structures which present a lower sheet bending face or edge. Where the frame component comprises a port 12 and a lid 16, as is preferred, the punch 34 is preferably fixedly attached in a laterally extending orientation immediately beneath the undersurface of the lid 16. Such punch attachment advantageously secures the punch 34 at an overlying location with respect to the interior processing space 11. Upon receipt of the chemical container 38 within space 11, such punch positioning further advantageously secures the punch 34 at an overlying orientation with respect to such container. Such punch orientation is advantageously functionally analogous to the common overlying positioning of a press brake machine's punch with respect to a workpiece sheet.

Referring to FIG. 2, structures constituting or structurally and functionally performing in the manner of a press brake machine's die are preferably operatively deployed within the interior processing space 11. Such die component may suitably comprise pairs of splayable or oppositely pivoting "L" brackets 74 and 82. The longitudinally extending arms of the "L" brackets 74 and 82 support container 38, and the upper surfaces of such arms may advantageously incorporate teeth 75 and 83 for friction enhancement and reduction of slippage during container pressing operations which are discussed below. Upper ends of the "L" brackets 74 and 82 may be supported by pivot joints 72 and 80 which are suitably spring biased for normal positioning of arms of the "L" brackets 74 and 82 at their substantially horizontal FIG. 2 orientations.

Figure 4:
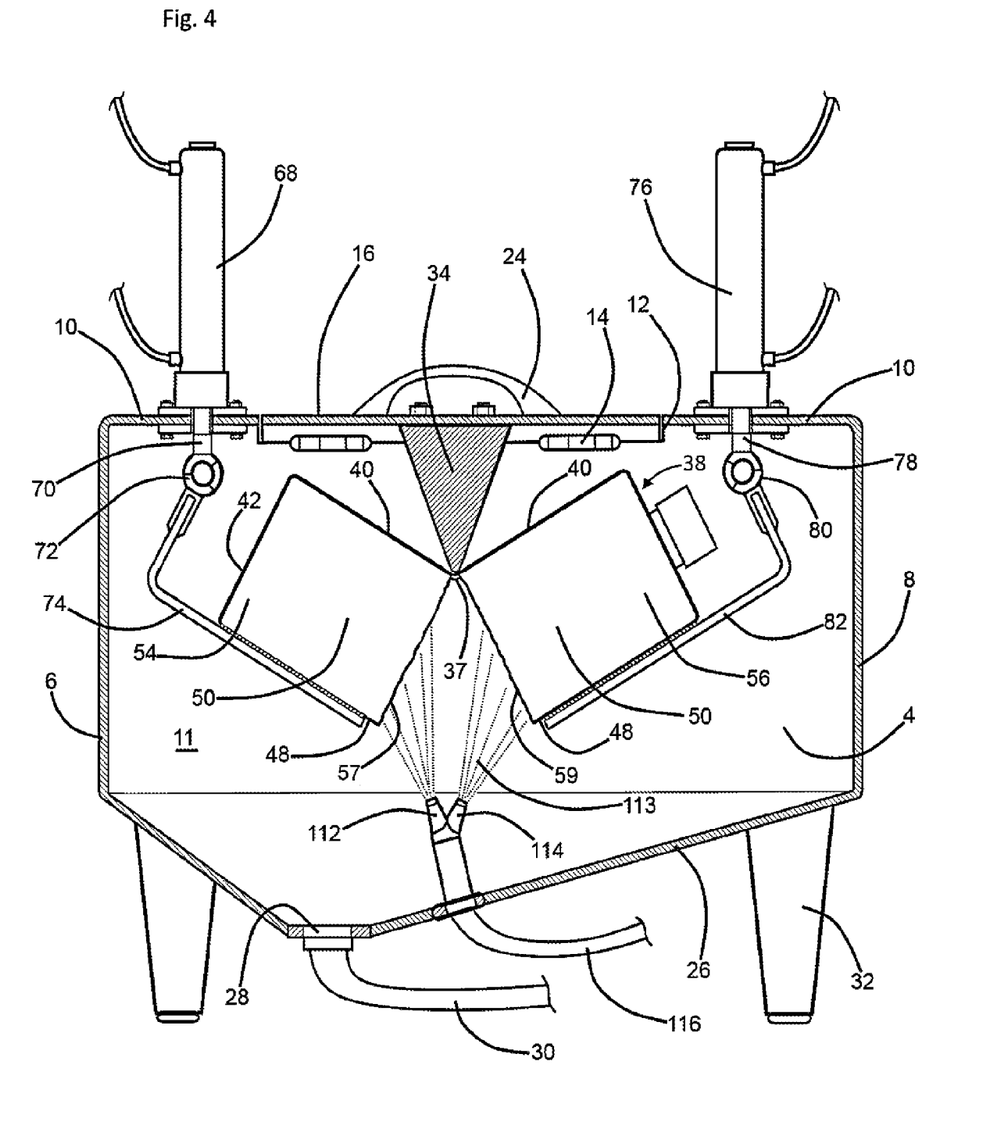
FIG. 4 redepicts the structure of FIG. 3, the view of FIG. 4 depicting subsequent automated container processing movements of structures.
Figure 5:
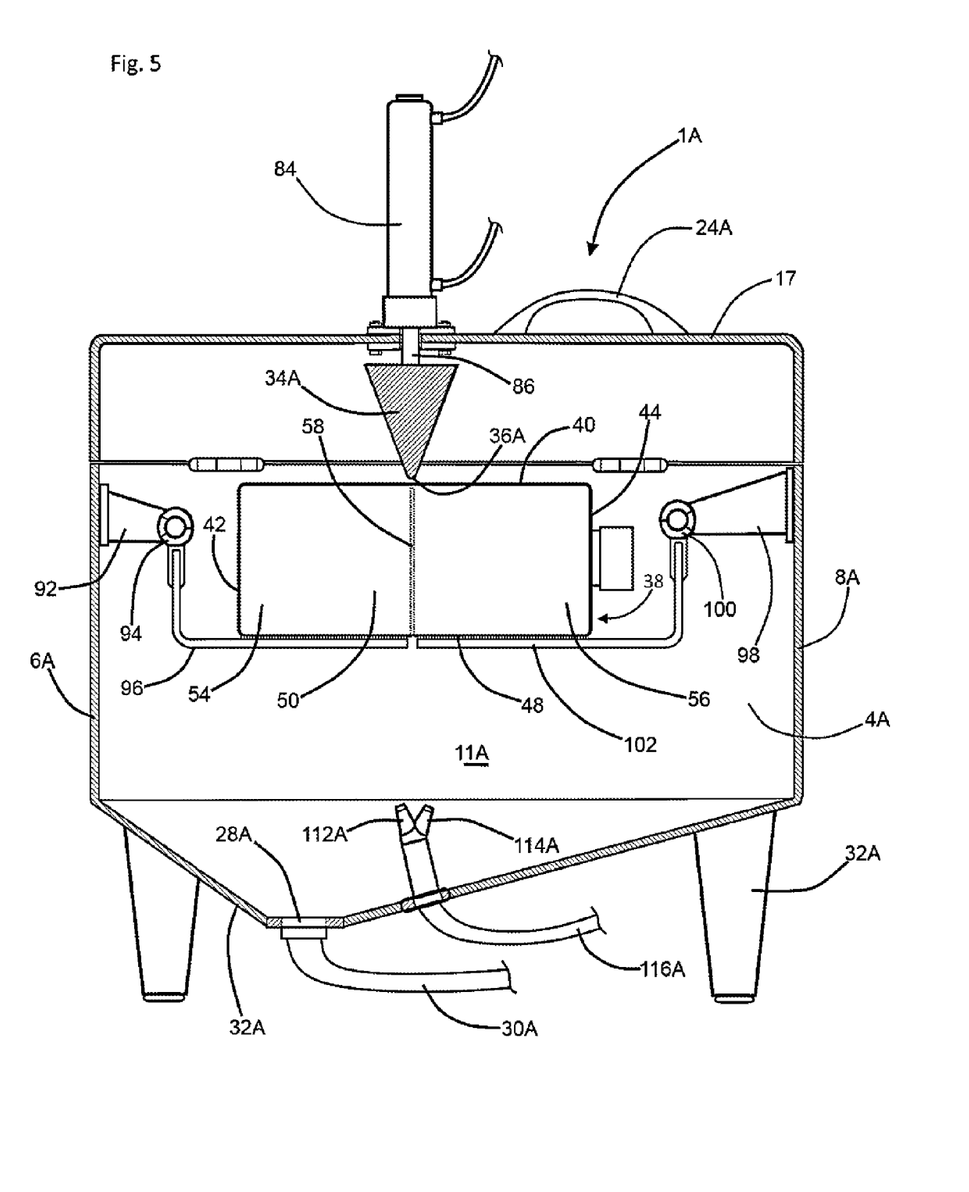
FIG. 5 presents an alternative configuration of the apparatus of FIGS. 1-4.

Referring to the alternative 1A structure of FIG. 5, all lead line structures having the suffix "A" are configured substantially identically with similarly numbered structures appearing in FIGS. 2-4. "L" brackets 96 and 102 are similarly supported by means of pivot joints 94 and 100, and such brackets are alternatively supported at fixed vertical positions via wall mounts 92 and 98. Such alternatively supported "L" brackets 96 and 102 function as container supporting and pressing die components similarly with die components 72, 74, 80, and 82 depicted in FIG. 2.

Figure 6:
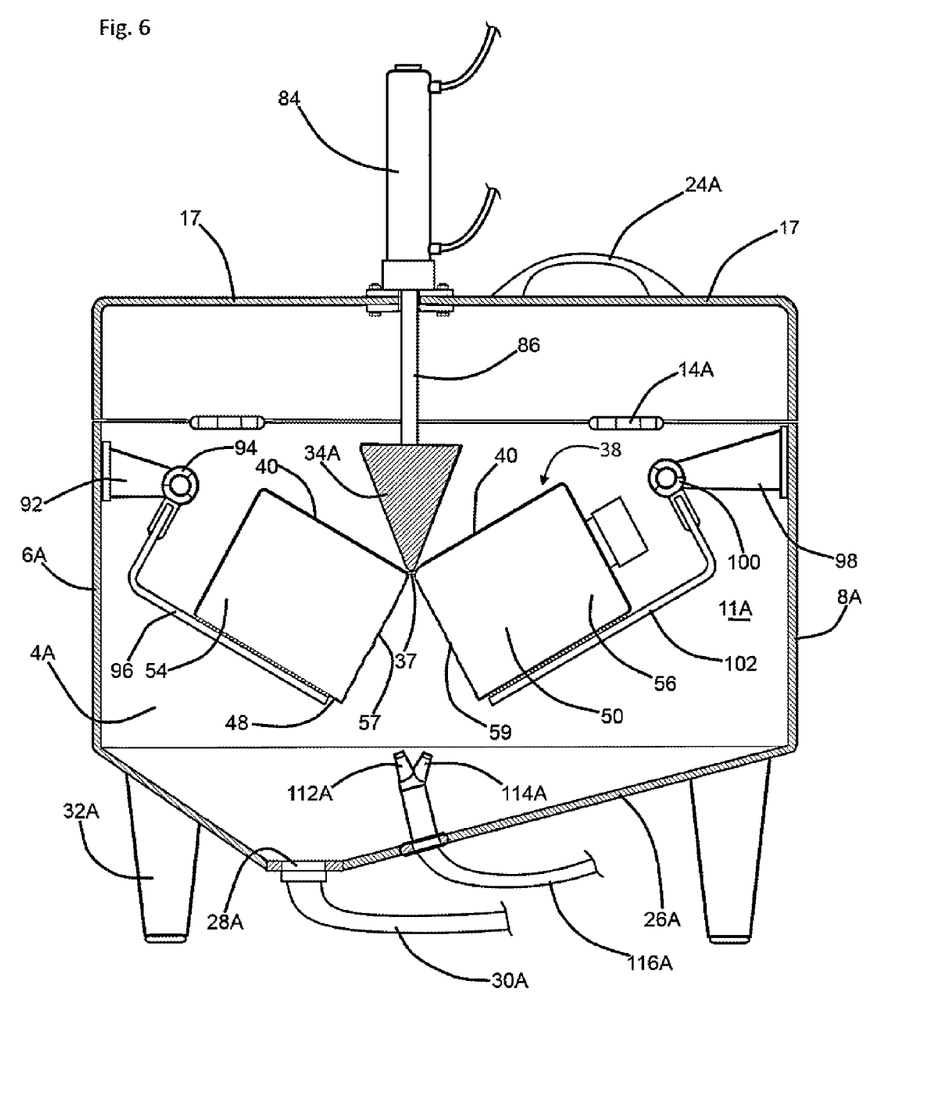
FIG. 6 redepicts the structure of FIG. 5, the view of FIG. 6 depicting subsequent automated container processing movements of structures.
Figure 7:
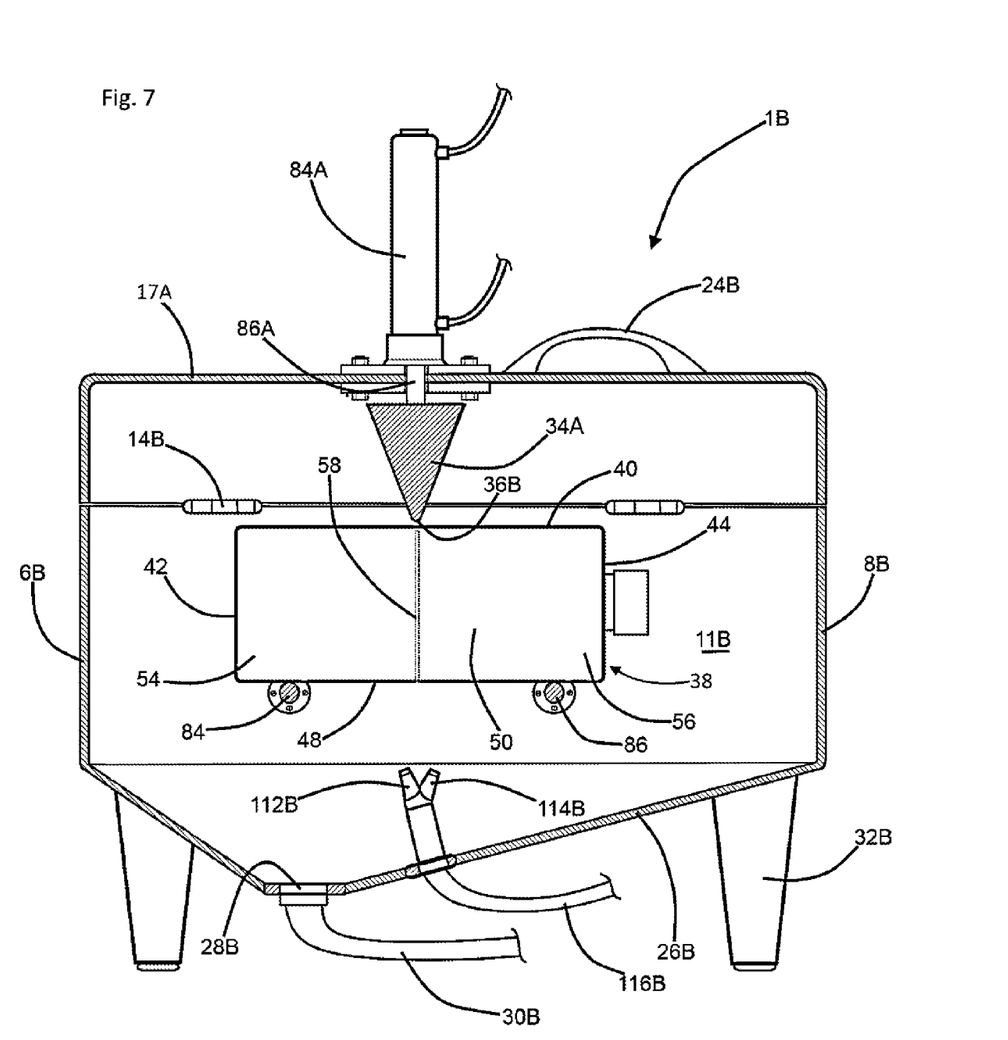
FIG. 7 presents an alternative configuration of the structures depicted in FIGS. 5 and 6.
Figure 12:
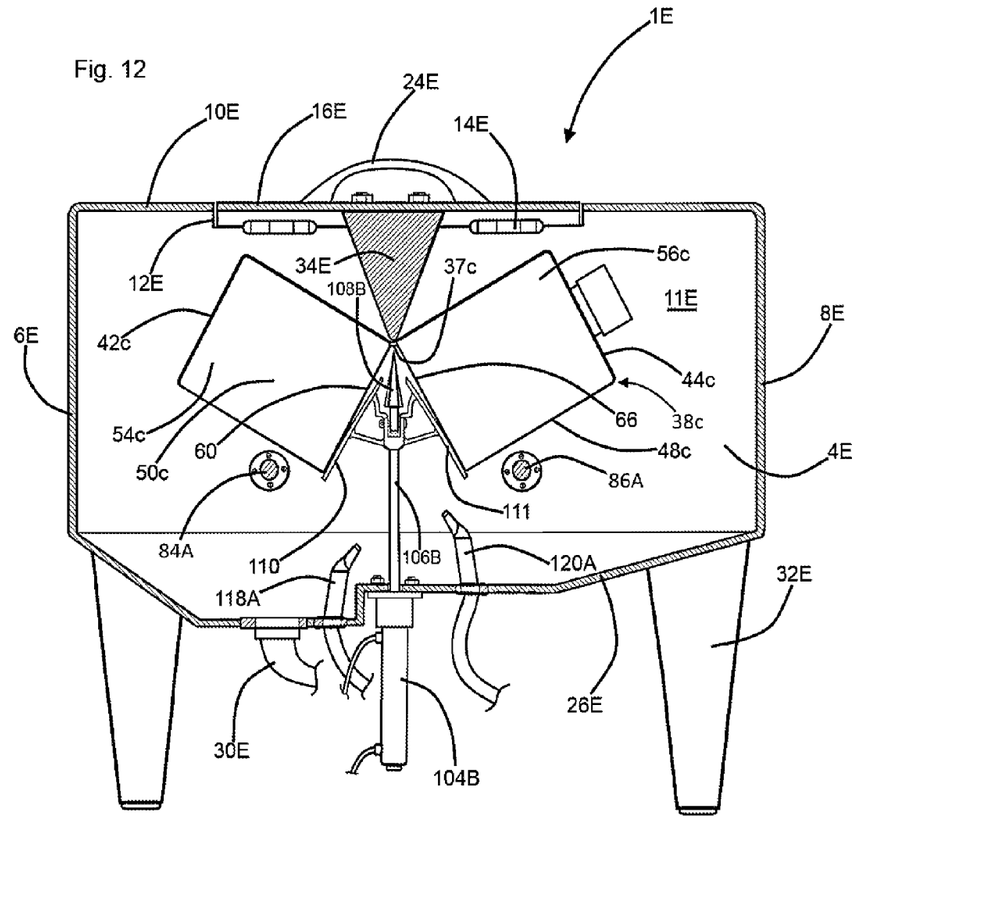
FIG. 12 presents a further structural alternative to the structures depicted in FIGS. 1-11.

In the alternative 1B structure of FIG. 7, all lead line structures bearing the suffix "B" are configured substantially identically with similarly numbered structures appearing in FIGS. 2-4, and all lead line structures bearing the suffix "A" are configured substantially identically with similarly numbered structures appearing in FIGS. 5 and 6. FIG. 7's rigidly mounted crossbars 84 and 86 represent a suitable and further alternative die component of the instant inventive apparatus. Referring further to FIG. 12, corresponding die/crossbar components 84A and 86A may further incorporate or operate in conjunction with container driving and splaying plates 110 and 111, the functions of which are further discussed below.

Each of the apparatus's alternative die components 72,74, 80,82 (of FIG. 2); 92,94,96,98,100,102 (of FIG. 5); 84,86 (of FIG. 7); or 84A,86A,110,111 (of FIG. 12) operates in the manner of a press brake machine's die component for compressively holding a sheet configured workpiece (e.g., upper wall 40 of container 38) against an overlying punch component (e.g., punch 34). Such die components are intended as being representative of other commonly known article holding and driving mechanisms which may similarly support and apply a compressive force to a workpiece.

Just as the thickness of a metal sheet worked by a press brake machine resists bending deflection of the sheet between the machine's punch and die components, the lower, lateral, and oppositely lateral walls of container 38 oppose bending deflection or splaying of the upper wall 40 of the container about the lower face 36 of the punch 34. To compensate for such mechanical opposition, bend resistance relieving means are preferably operatively incorporated within the inventive apparatus. In a suitable embodiment, the provided bend resistance relieving means may comprise the counter-pivoting arms 74 and 82 in combination with a frangible channel formed within the lateral, oppositely lateral, and lower walls of the container 38. In operation of such bend resistance relieving means, referring simultaneously to FIGS. 2-4, punch and die actuated pressure exerted against the container 38 causes the upper bendable sheet 40 to impinge against the lower contact face 36 of punch 34, such pressure producing torsion about bend point 37 and producing tension at and within the container's underlying lateral, oppositely lateral, and lower walls. Upwardly directed pressure against punch 34 may advantageously produce wall tension which exceeds the shear strength of those walls at and along frangible channel 58, resulting in segmentation of the container 38 between its longitudinal and oppositely longitudinal ends 54 and 56. Simultaneously with effecting such container segmentation, the bend resistance relieving means allows the container to open at and angularly splay at the wall shears 57 and 59.

The wall shears 57 and 59 dually function for reduction of bend resistance, allowing the punch 34 to form the laterally extending bend 37 within upper wall 40, and for splaying and centrally opening the container for fluid purging. Upon splaying of the container 38, as indicated in FIG. 4, the fluid contents 53 rapidly flows downwardly into and through the interior processing space 11 for downward drainage through floor port 28, and for carriage to a collecting tank (not depicted within views) via hose 30.

Figure 8:
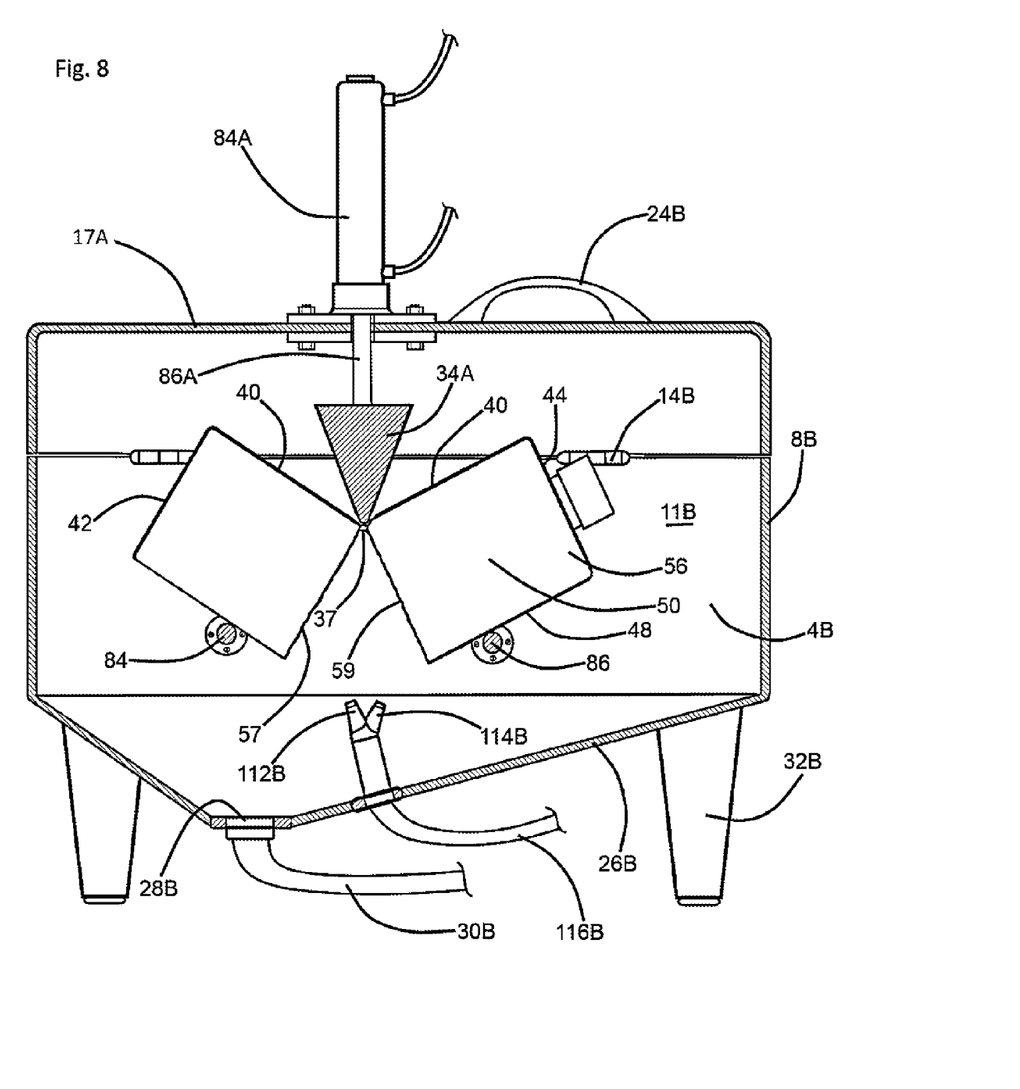
FIG. 8 redepicts the structure of FIG. 7, the view of FIG. 8 depicting subsequent automated container processing movements of structures.
Figure 9:
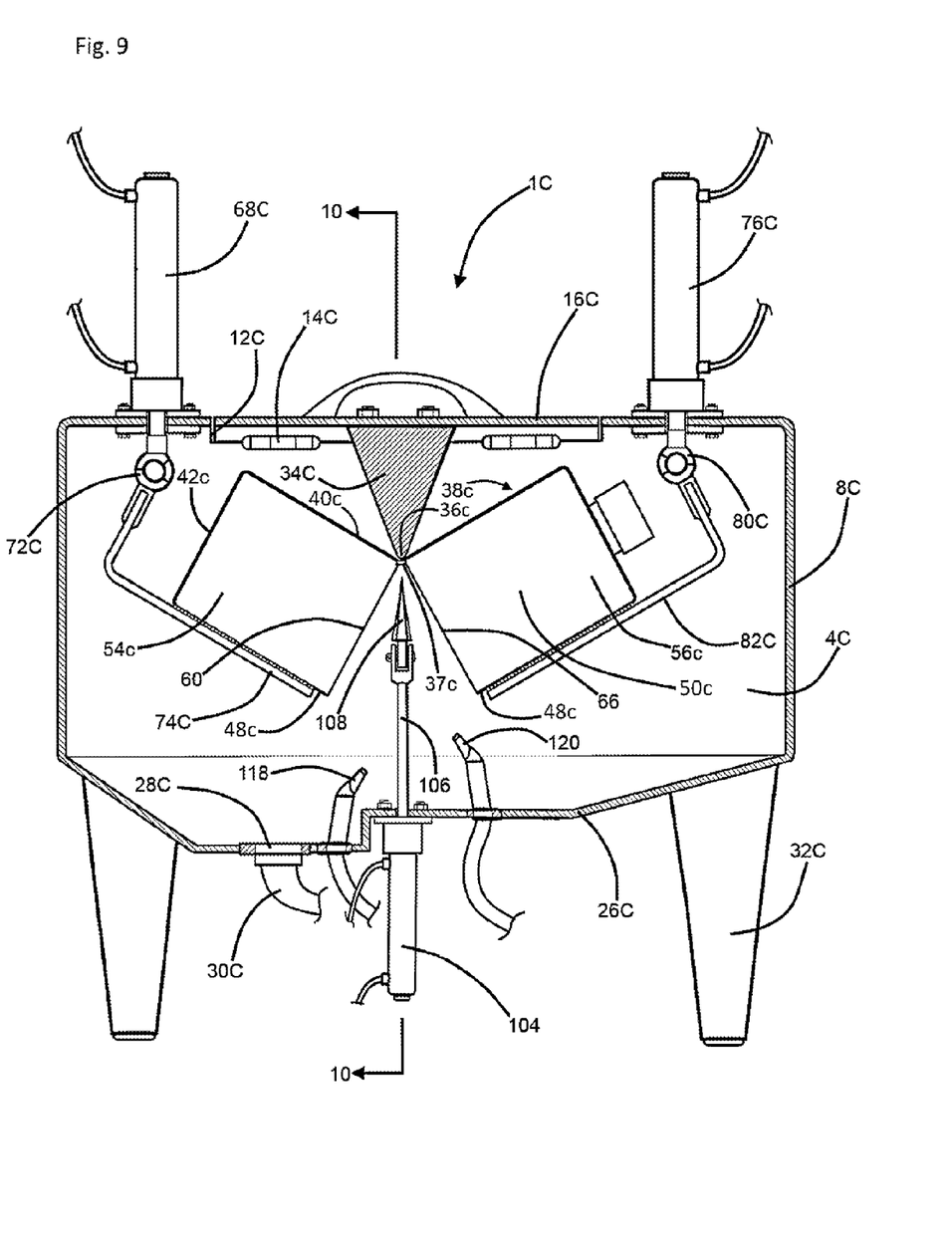
FIG. 9 presents a further structural alternative to the structures depicted in FIGS. 1-8.
Figure 10:
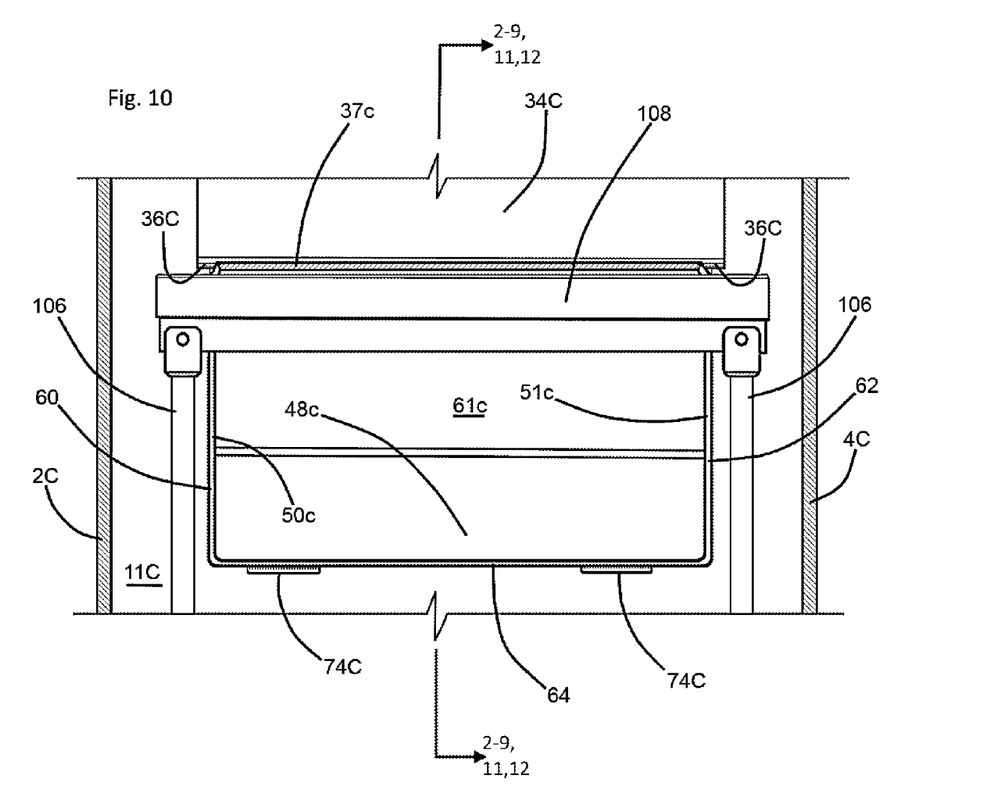
FIG. 10 is a partial sectional view as indicated in FIG. 9.

In the alternative configuration 1C of FIG. 9, all lead line reference numerals bearing the suffix "C" identify structures substantially identical to similarly numbered structures appearing in FIGS. 1-4, and container structures bearing the suffix "c" similarly correspond with FIGS. 2-4 container structures. The alternative bend resistance relieving means depicted in FIGS. 9 and 10 comprises a laterally extending knife 108 whose lateral and oppositely lateral ends are supported upon piston shafts 106 which are driven by underlying pneumatic or hydraulic cylinder linear motion actuators 104. Operation of such knife 108 and linear motion actuators 104,106 combination to induce reciprocating vertical cutting motions of the knife 108 with respect to container 38c advantageously cuts the container's lower wall 48c and lateral and oppositely lateral walls 50c and 51c along shear lines or cuts 60, 62, 64, and 66. Similarly with the bend resistance relieving means depicted in FIGS. 2-8, such knife shearing of the chemical container 38c effectively relieves the container's bend resistance, advantageously allowing the container's upper wall 40c to deflect about punch face 36C to produce a container splaying and opening bend 37c.

Where the walls of the chemical container 38c comprise soft plastic, the knife 108 may suitably comprise or may be alternatively configured as a tensioned length of high strength steel wire (not depicted within views), the cutting edge of the rigid knife 108 representing such tensioned wire. The reciprocating knife assembly 108,106,104 depicted in FIGS. 9 and 10 is intended as being representative of other commonly known automated sheet material cutting apparatus such as rotating saw blades, reciprocating saw blades, track guided knife blades and pivoting knife blades which may be alternatively mounted and deployed for bend resistance relief within processing space 11c.

Referring to FIGS. 3 and 4, the instant inventive assembly preferably incorporates pressing means which are either connecting operatively to the punch 34 or are operatively connected to the die (e.g., "L" brackets 74 and 82). In operation, the pressing means relatively move the apparatus's punch and die components to lessen the downward displacement of the die with respect to the punch. Such downward displacement lessening function operatively drives the chemical container 38 against punch 34. The apparatus's pressing means suitably comprises at least a first and preferably a plurality of hydraulic or pneumatic cylinders 68 and 70 which reciprocatingly drive the die's "L" brackets 74 and 82 by means of piston shafts 70 and 78. The pneumatic or hydraulic cylinders 68 and 76 are intended as being representative of other commonly known linear motion actuators such as jack screw actuators, rack and pinion gear actuators, lever arm actuators, and plunger actuators.

Upon configuring and positioning the apparatus 1 and chemical container 38 in the manner depicted in FIG. 3, cylinders 68 and 76 may be actuated to upwardly draw piston shafts 70 and 78, simultaneously upwardly drawing attached the "L" bracket dies 74 and 82. Resultant pressurized contact of the upper wall 40 of the container 38 against the curved lower face 36 of the punch 34 produces bend resistance relieving shears or tears 57 and 59 along frangible channel 58, and allows splaying and opening of the container, as indicated in FIG. 4.

In the alternative 1A configuration of FIG. 5, container 38 may be inserted into processing space 11A upon pivoting opening of upper lid 17. The pressing means associated with lid 17 comprise at least a first cylinder 84 which reciprocatingly and vertically drives punch 34A via piston shaft 86. Downwardly directed pressure exerted by punch 34A against upper wall 40 of container 38 functions with respect to the container 38 substantially identically with the above described functions of the die drawing cylinders 68 and 76.

In the similarly configured pressing means of the FIG. 7, the container 38 is driven downwardly between die crossbars 84 and 86, such downward pressure splaying and opening the container as indicated in FIG. 8.

In the 1E structural alternative depicted in FIG. 12, all lead line reference numerals bearing the suffix "E" are configured substantially identically with similarly numbered reference numerals appearing in FIGS. 2-4, all lead line reference numerals bearing the suffix "B" are configured substantially identically to similarly numbered reference numerals appearing in FIGS. 9 and 10, and all lead line reference numerals bearing the suffix "c" identify container structures substantially identical to similarly numbered structures appearing in FIGS. 2-4. The alternate pressing means of the 1E structural alternative comprises reciprocating knife configured bend resistance reliever 104B, 106B, 108B, and further incorporates the container driving and splaying plates 110 and 111. By providing such plates 110 and 111, the underlying cylinder configured linear motion actuator 104B, 106B is ascribed triple functions of press brake driving of the container 38c, container wall bend resistance relieving "V" splaying of the container's segmented longitudinal and oppositely longitudinal ends 54c and 56c.

The apparatus's depicted pressing means (68,70,76,78 of FIG. 2; 84,86 of FIGS. 5; and 104B,106B,108B,110,111 of FIG. 12) are intended as being representative of other commonly known linear motion actuators such as plunger actuators, jack screw actuators, lever arm actuators, and rack and pinion gear actuators, which may similarly perform press brake action driving against the container 38, 38c.

Referring to FIG. 4, the instant apparatus preferably further comprises rinsing means which are connected operatively to the frame. In the FIG. 4 embodiment, the rinsing means suitably comprise a water hose 116 which traverses floor 26 to communicate with a pair of spray nozzles 112 and 114. Upon shearing and splaying of the container 38 as indicated in FIG. 4, and subsequent to gravity purging of the container's liquid contents, pressurized water 113 may be introduced into hose 116 for spraying and rinsing the interior surfaces of container 38. In the FIG. 9 structural alternative, longitudinally separated rinsing means 118 and 120 are provided to accommodate for the centrally located knife configured bend resistance relieving means.

Figure 11:
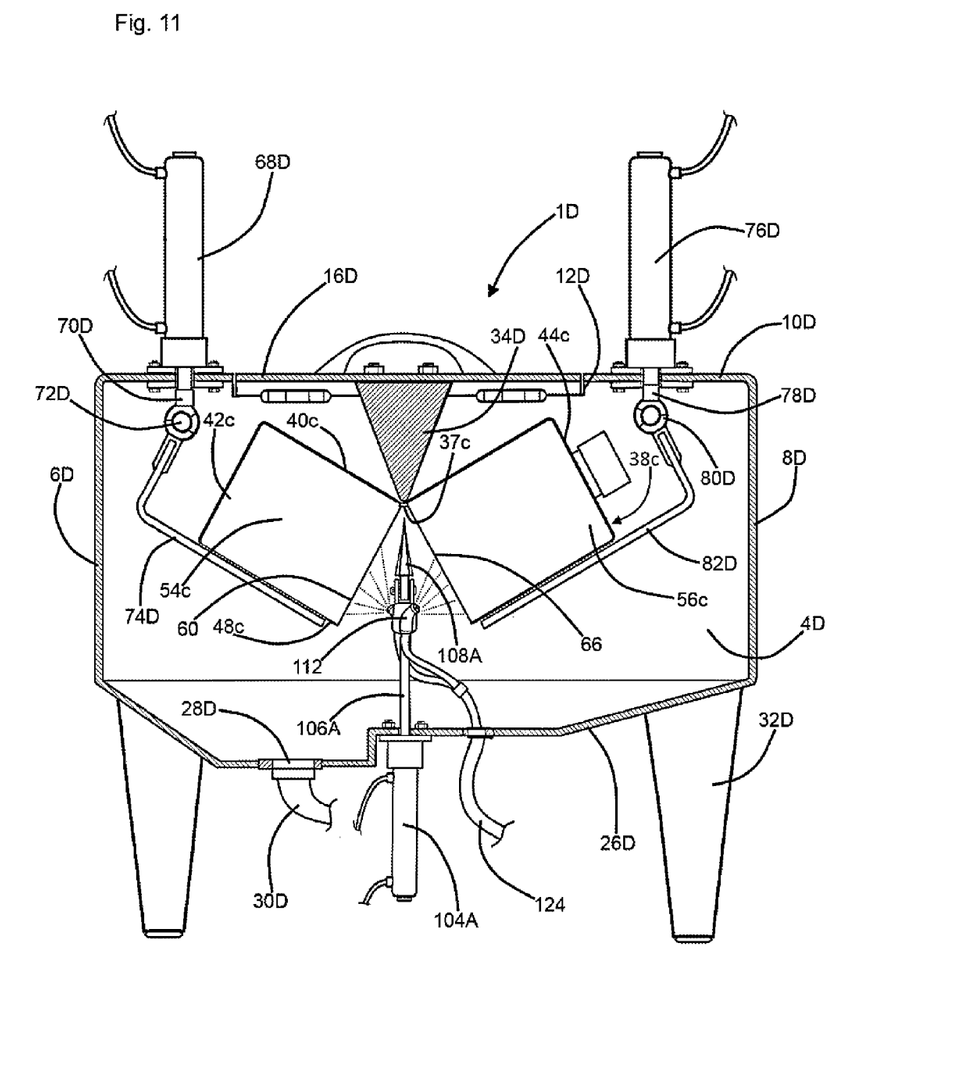
FIG. 11 presents a further structural alternative to the structures depicted in FIGS. 1-10.

In the 1D structural alternative of FIG. 11, the rinsing means comprise a water hose 124 which communicates with spray nozzles 122, such nozzles being attached to and reciprocatingly carried by the knife blade 108A to assume an interior position with respect to container 38c. Upon introduction of pressurized water into hose 124, the water advantageously sprays from nozzles 122 directly onto container interior surfaces for effective interior rinsing.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. An apparatus for purging and rinsing a chemical container, the chemical container comprising an upper bendable sheet, a lateral wall, an oppositely lateral wall, and a lower wall, the chemical container further comprising longitudinal and oppositely longitudinal ends, the apparatus for purging and rinsing the chemical container comprising:
    (a) a frame defining a processing space;
    (b) a punch positioned for, upon a receipt of the chemical container within the processing space, overlying the chemical container's upper bendable sheet;
    (c) a die displaced downwardly from the punch, the die being positioned for, upon said chemical container receipt, underlying the chemical container;
    (d) bend resistance relieving means connected operatively to the frame, the bend resistance relieving means being adapted for, upon said chemical container receipt, segmenting the chemical container between its longitudinal and oppositely longitudinal ends;
    (e) pressing means connected operatively to the punch or connected operatively to the die, the pressing means being adapted for lessening the die's downward displacement from the punch, the pressing means being further adapted for bending the chemical container's upper bendable sheet about the punch, and for opening the chemical container beneath the upper bendable sheet's bend; and
    (f) rinsing means connected operatively to the frame, the rinsing means being adapted for spraying fluids into the chemical container's longitudinal and oppositely longitudinal ends.

2. The apparatus for purging and rinsing a chemical container of claim 1 wherein the pressing means are further adapted for splaying the chemical container's longitudinal and oppositely longitudinal ends.

3. The apparatus for purging and rinsing a chemical container of claim 2 wherein the pressing means comprise at least a first linear motion actuator.

4. The apparatus for purging and rinsing a chemical container of claim 3 wherein the punch comprises an arcuately curved and laterally extending edge.

5. The apparatus for purging and rinsing a chemical container of claim 4 wherein the at least first linear motion actuator comprises a piston and cylinder combination.

6. The apparatus for purging and rinsing a chemical container of claim 4 wherein the bend resistance relieving means comprise a wall shearing member selected from the group consisting of wall cutting knifes and frangible channels.

7. The apparatus for purging and rinsing a chemical container of claim 6 wherein the rinsing means comprise at least a first spray nozzle.

8. The apparatus for purging and rinsing a chemical container of claim 7 wherein the frame comprises a catch basin floor having a drain port.

9. The apparatus for purging and rinsing a chemical container of claim 8 wherein the frame further comprises a ceiling having a container insertion port.

10. The apparatus for purging and rinsing a chemical container of claim 9 further comprising a lid adapted for removably covering the container insertion port.

11. The apparatus for purging and rinsing a chemical container of claim 10 wherein the punch is further positioned beneath the lid.

12. The apparatus for purging and rinsing a chemical container of claim 11 wherein the punch suspends from the lid.

* * * * *